2,512,419

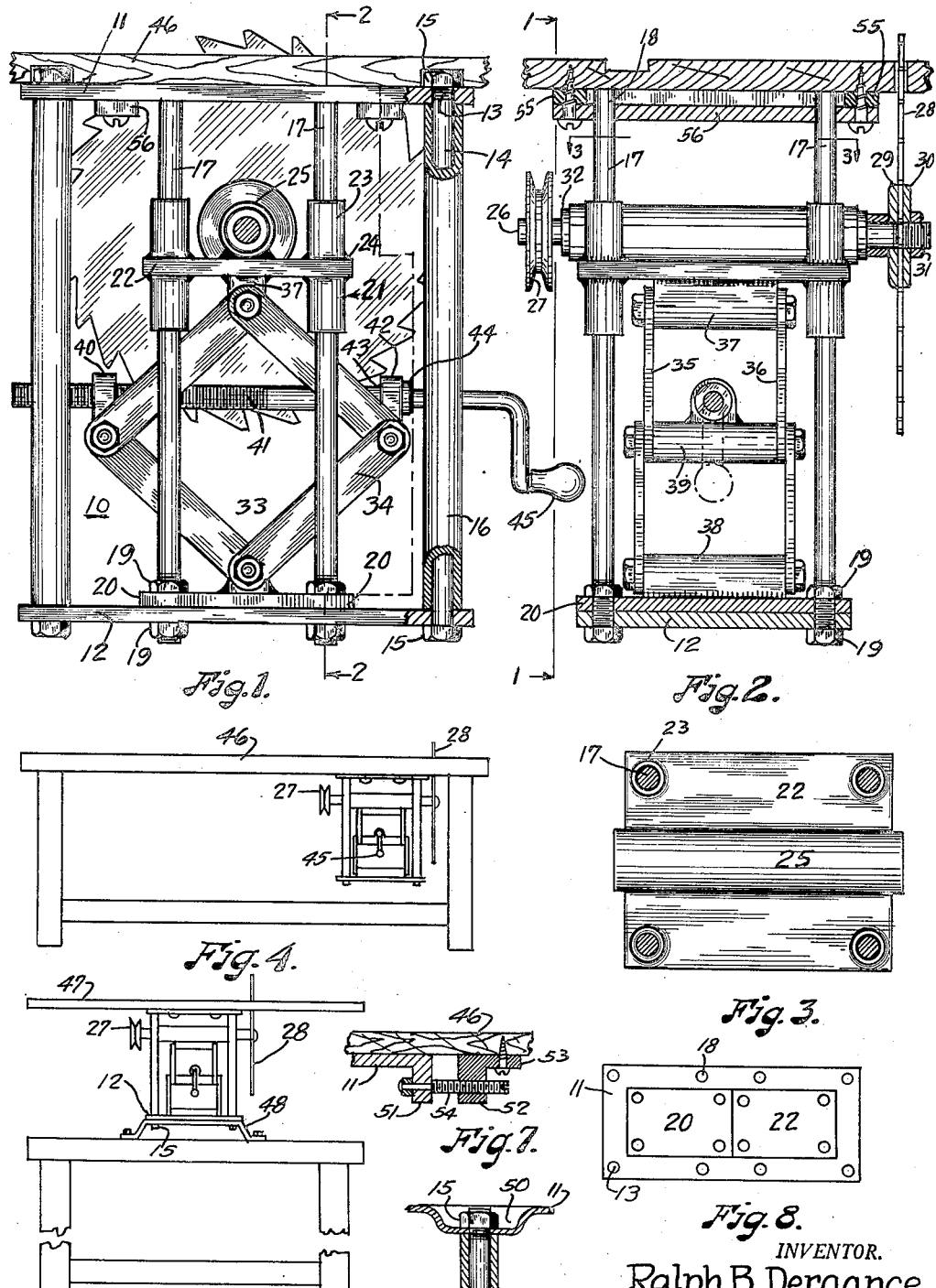
June 20, 1950 — R. B. DERGANCE — 2,512,419
SAW TABLE WITH VERTICALLY ADJUSTABLE CIRCULAR SAW
Filed July 23, 1948
INVENTOR.
Ralph B. Dergance
BY Martin E. Anderson
ATTORNEY Patented June 20, 1950

UNITED STATES PATENT OFFICE 2,512,419

SAW TABLE WITH VERTICALLY ADJUST-
ABLE CIRCULAR SAW

Ralph B. Dergance, Denver, Colo.

Application July 23, 1948, Serial No. 40,390

4 Claims. (Cl. 143—35)

This invention relates to improvements in wood working machines and more particularly to a circular saw.

In prior art devices of this kind, due to the many and different parts required for their production, an excessive number of tooling and machinery operations have been required which has necessarily rendered the cost thereof relatively high.

A primary object of the invention therefor, is to provide a circular saw in which is eliminated many difficult machining operations thereby reducing its cost.

Another object is to provide a saw which is constructed of a few duplicate parts.

Another object is to provide a saw which is light in weight, but yet has optimum rigidity.

Another object is to produce a saw which may be secured as an attachment to an ordinary flat top work bench utilizing same as the saw table.

A further object is to provide a saw which may be constructed as a complete unit for attachment to any suitable support.

The above and other objects that may become apparent as the description proceeds are attained by means of a construction and an arrangement of parts that will now be described in detail and for this purpose reference will be had to the accompanying drawing in which the invention has been illustrated in its preferred form, and in which:

Figure 1 is a side elevational view of the invention, partly in section, taken on line 1—1, Figure 2;

Figure 2 is an end elevational view taken on line 2—2, Figure 1;

Figure 3 is a sectional view taken on line 3—3, Figure 2;

Figure 4 is a side elevational view of the device in reduced scale shown attached to and depending from the lower side of a work table;

Figure 5 is a side elevational view of the device in reduced scale shown attached to the top of a table;

Figure 6 is a sectional view of a modified supporting plate structure;

Figure 7 is a sectional view of an adjustment employed with the device shown in Figures 1 and 4; and Figure 8 is a plan view in reduced scale of a modified form of plate structure.

Referring in detail to the drawing, there is shown in Figures 1 and 2 a saw frame 10 comprising an upper plate 11 and a lower plate 12, one or the other of which is adapted to be secured to a suitable support and between which the operative parts of the saw are mounted. These plates are rectangular in shape and have a circular opening 13 at each of the four corners. These plates are secured together in spaced parallel relationship by tie bolts 14, nuts 15, 15 and spacer tubes 16.

Frame 10 is also provided with four vertical guide rods 17 which have free ends extending into openings 18 in the top plate 11. The lower end of guide rods 17 are secured to lower plate 12 by nuts 19 and between nuts 19 and plate 12 is interposed a plate 20, the purpose of which is hereafter set forth.

Upon guides 17 is mounted a sliding saw arborhead which comprises a plate 22 having at its corners guide tubes 23. These tubes extend through corner holes in plate 22 and are welded, brazed, or otherwise affixed thereto, as shown at 24. A saw arbor tube 25 is attached to plate 22 in a similar manner and is substantially the same length as plate 22 as shown in Figure 2. Saw arbor tube 25 is provided with suitable bearings either of the anti-friction or bushing type, which bearings support an arbor or saw shaft 26 having a pulley 27 at one end and a saw 28 at the other end. The shaft is also provided with the conventional saw arbor flanges 29, 30, nut 31 and a collar 32 for adjusting the end play in the arbor shaft.

The saw arbor head 21 is adjusted vertically to vary the depth of cut of the saw by a linkage system 33. This system comprises eight identical links 34 pivoted together in separate spaced sets of four as shown at 35, 36, Figure 2. Each set has the ends of the links pivoted together to form a closed parallelogram linkage similar to a lazy tong. The upper ends of the pairs are pivotally connected at the top to a tube 37 welded to the lower side of plate 22 and the lower ends of the pairs are similarly secured to a tube 38, secured to plate 20. Through tubes 37 and 38 extend suitable bolts or studs which pivotally secure the upper and lower sets of links thereto.

Tubes 39 extend between the two sets of links at their lateral ends and are pivotally secured thereto by bolts or studs in the same manner as described for the upper and lower ends of the sets. The left tube 39 in Figure 1 carries a threaded lug 40 through which extends a threaded shaft 41 which is rotatably mounted in a similar, but unthreaded lug 42 secured to the right tube 39. Shaft 41 may be shouldered at 43 and a suitable collar 44 provided so that shaft 41 may rotate in lug 42, but will not have endwise movement. Shaft 41 is provided at one end with a crank 45 for rotating same and it will now become apparent that upon rotation thereof in a selected direction the arbor head 21 will be raised or lowered to adjust the depth of cut of the saw. By merely transposing the tubes 39 and thus the lugs 40, 42, the crank 45 may be disposed in a position most convenient to the operator, that is, either at the front or back of the saw frame.

In Figure 4 is shown one manner in which the subject of the invention may be used. The saw frame 10 is shown mounted to the lower side of a conventional bench 46 suitably secured thereto by the upper plate 11 through which may extend wood screws or the like. The user may thus mount the saw frame to an existing work bench or may construct the bench of such size and configuration to conform to his specialized requirements.

Figure 5 illustrates another manner of use wherein the lower rather than the upper plate is mounted to a bench or suitable stand and in this event the saw may be constructed complete with saw table 47, or the saw may be constructed as an attachment and the user may construct the saw table 47 to meet his needs. When the saw is to be used as shown in Figure 5, suitable legs 48 may be incorporated therewith which are secured to lower plate 12 by nuts 15. This eliminates recessing the bench for nuts 15 which might otherwise occur.

Figure 6 shows a modification of top or bottom plate structure wherein such plates are formed with depressions 50 at their corners to receive nuts 15. This construction renders the outer surfaces of the top and bottom plates smooth and uninterrupted and eliminates the necessity of providing recesses in the bench or saw table for their reception.

Figure 7 shows an adjusting device for moving the saw frame with respect to a bench when the saw frame is mounted as in Figure 4 to thus provide for belt adjustment in event the driving motor or drive shaft may not be adjusted. This device comprises a lug 51 secured to plate 11, a second lug 52 which may be secured to the bench by an ear 53 and an adjusting screw 54 connecting the two lugs. When this adjustment is provided the upper plate 11 is mounted between parallel guide plates 55 and straps 56 extend between these plates and beneath top plate 11, the ends thereof and the straps being secured to the underside of the bench by suitable screws or the like as shown in Figures 1 and 2.

Figure 8 shows an alternative construction for top and bottom plates 11, 12. In this construction, these plates are formed with a rectangular opening therein and from the sheet material cut from the opening the plates 20, 22, are formed, together with all the necessary holes for the various vertical tie rods and guides. With this construction, three different pieces of the saw are formed by one punch press operation.

In assembling the various parts of the arbor head 21, or the plate 20 and its tube 38, the various parts are clamped in suitable fixtures to properly align them and such parts are then welded, brazed or otherwise secured together. The same procedure may also be employed for assembly of lugs 40 and 42 to their respective tubes 39. When the foregoing manner of construction is employed, the various parts may be made of steel or other inexpensive strong material and optimum strength and rigidity achieved with extreme lightness. Alternatively, if production costs dictate, certain of the various parts may be constructed as castings.

Having described the invention what is claimed as new is:

1. A circular saw machine of the class described comprising, a substantially rectangular flat upper plate, a substantially identical lower plate, vertical rods extending between said plates at the corners thereof and securing said plates in spaced parallel relationship, two pairs of spaced vertical guide rods extending between said plates, a saw arbor having guide means for engaging said guide rods, a parallelogram linkage system for each pair of guide rods, each linkage system being connected to the saw arbor and lower plate and means for simultaneously operating both linkage systems to adjust vertically the saw arbor on the guide rods.

2. A circular saw machine comprising a substantially rectangular flat upper plate, a substantially identical lower plate, vertical rods extending between said plates at the corners thereof and securing said plates in spaced parallel relationship, two pairs of spaced vertical guide rods extending between said plates, a saw arbor having guide means for engaging said guide rods, a parallelogram linkage system for each pair of guide rods, each linkage system being connected at upper and lower opposite pivot points to the saw arbor and lower plate respectively and tubes connecting the other opposite pivot points and extending between the two sets of links at their lateral ends, a threaded lug carried by one of the tubes and an unthreaded lug carried by the other tube, a rotatably mounted shaft extending through both lugs, a crank provided at one end of said shaft to rotate the same whereby both linkage systems are simultaneously operated to adjust the saw vertically on the guide rods.

3. A circular saw table comprising a substantially rectangular flat upper plate, a substantially identical lower plate, vertical rods extending between said plates at the corners thereof and securing said plates in spaced parallel relationship, two pairs of spaced vertical guide rods extending between said plates, a saw arbor, guide means on said arbor and slidable on said guide rods, a parallelogram linkage system for each pair of guide rods, each linkage system being connected at upper and lower opposite pivot points to the saw arbor and lower plate respectively, tubes connecting the other opposite pivot points and extending between the two sets of links at their lateral ends, a threaded lug carried by one of the tubes, and an unthreaded lug carried by the other tube, a revolvably mounted threaded shaft extending through both lugs, a crank provided at one end of said shaft to rotate the same whereby both linkage systems are simultaneously operated to adjust the saw arbor vertically relative to the table.

4. A circular saw machine of the class described comprising a flat upper plate, a lower plate secured in spaced parallel relationship therewith, two pairs of spaced vertical guide rods extending between said plates, a saw arbor having guide means for engaging said guide rods, a parallelogram linkage system for each pair of guide rods, each linkage system being connected to the saw arbor and lower plate and means for simultaneously operating both linkage systems to adjust vertically the saw arbor on the guide rods.

RALPH B. DERGANCE.

REFERENCES CITED

The following references are of record in the file of this patent:

UNITED STATES PATENTS

| Number | Name | Date |
| --- | --- | --- |
| 141,975 | Xander | Aug. 19, 1873 |
| 881,064 | Favreau | Mar. 3, 1908 |
| 1,387,869 | Royle | Aug. 16, 1921 |
| 1,462,764 | Nyquist et al. | July 24, 1923 |
| 1,825,104 | Stacheli | Sept. 29, 1931 |
| 1,901,915 | Loughridge | Mar. 21, 1933 |
| 2,323,248 | Sellmeyer | June 29, 1943 |